United States Patent
Sachau et al.

(10) Patent No.: US 12,145,193 B2
(45) Date of Patent: Nov. 19, 2024

(54) CORES FOR DIE CASTING

(71) Applicant: HÜTTENES-ALBERTUS Chemische Werke Gesellschaft mit beschränkter Haftung, Düsseldorf (DE)

(72) Inventors: Sabrina Maria Sachau, Langenhagen (DE); Maria Schweinefuß, Hannover (DE); Christian Lustig, Düsseldorf (DE); Klaus Seeger, Hannover (DE)

(73) Assignee: HUTTENES-ALBERTUS Chemische Werke Gesellschaft mit beschränkter haftung, Düsseldorf (DE)

( * ) Notice: Subject to any disclaimer, the term of this patent is extended or adjusted under 35 U.S.C. 154(b) by 186 days.

(21) Appl. No.: 17/778,271

(22) PCT Filed: Nov. 18, 2020

(86) PCT No.: PCT/EP2020/082498
§ 371 (c)(1),
(2) Date: May 19, 2022

(87) PCT Pub. No.: WO2021/099366
PCT Pub. Date: May 27, 2021

(65) Prior Publication Data
US 2023/0001470 A1   Jan. 5, 2023

(30) Foreign Application Priority Data

Nov. 22, 2019   (DE) .......................... 102019131676.6

(51) Int. Cl.
| | | |
|---|---|---|
| B22C 3/00 | (2006.01) |
| B22C 1/18 | (2006.01) |
| B22C 9/10 | (2006.01) |
| C04B 14/02 | (2006.01) |
| C04B 14/04 | (2006.01) |
| C04B 14/06 | (2006.01) |
| C04B 14/10 | (2006.01) |
| C04B 28/24 | (2006.01) |
| B22D 17/00 | (2006.01) |
| C04B 103/00 | (2006.01) |
| C04B 111/00 | (2006.01) |

(52) U.S. Cl.
CPC ................ *B22C 3/00* (2013.01); *B22C 1/188* (2013.01); *B22C 9/10* (2013.01); *C04B 14/024* (2013.01); *C04B 14/046* (2013.01); *C04B 14/06* (2013.01); *C04B 14/10* (2013.01); *C04B 28/24* (2013.01); *B22D 17/00* (2013.01); *C04B 2103/0093* (2013.01); *C04B 2111/00551* (2013.01); *C04B 2111/0087* (2013.01)

(58) Field of Classification Search
CPC .. B22C 1/18; B22C 1/188; B22C 3/00; B22C 9/10
USPC ................... 164/6, 15, 23, 33, 369
See application file for complete search history.

(56) References Cited

U.S. PATENT DOCUMENTS

| | | |
|---|---|---|
| 2009/0095439 A1 | 4/2009 | Stotzel |
| 2013/0068129 A1 | 3/2013 | Hudler |
| 2014/0255601 A1 | 9/2014 | Kloskowski |
| 2016/0361756 A1 | 12/2016 | Deters |
| 2018/0318912 A1 | 11/2018 | Trinowski |
| 2020/0001354 A1 | 1/2020 | Jattke |
| 2020/0130049 A1 | 4/2020 | Lustig |
| 2020/0391279 A1 | 12/2020 | Bach |

FOREIGN PATENT DOCUMENTS

| | | | |
|---|---|---|---|
| DE | 102012020510 | 4/2014 | |
| DE | 102014004914 | 2/2015 | |
| DE | 10 2017 107 657 A1 * | 7/2018 | ............... B22C 9/12 |
| DE | 102017107657 | 7/2018 | |
| EP | 0412761 | 2/1991 | |

OTHER PUBLICATIONS

Machine translation of DE 10 2017 107 657 A1 (Year: 2018).*

* cited by examiner

*Primary Examiner* — Kevin P Kerns
(74) *Attorney, Agent, or Firm* — DUANE MORRIS LLP; Gregory M. Lefkowitz; Brandon A. Chan (57) ABSTRACT

What are described are the use of a refractory coating composition for production of cores for diecasting, a kit for production of cores for use in diecasting, a method of producing cores for use in diecasting, cores for use in diecasting, and the use of such cores in diecasting, especially of lightweight metals.

5 Claims, 2 Drawing Sheets

CORES FOR DIE CASTING

CROSS-REFERENCE TO RELATED APPLICATIONS

This application is a § 371 national stage entry of International Application No. PCT/EP2020/082498, filed on Nov. 18, 2020, which claims priority to German Patent Application No. 102019131676.6, filed on Nov. 22, 2019, the entire contents of which are incorporated herein by reference.

FIELD OF THE INVENTION

The present invention relates to the use of a refractory coating composition for production of cores for diecasting, to a kit for production of cores for diecasting, to a method of producing cores for diecasting, to cores suitable for use in diecasting, and to the use of such cores in diecasting, especially in the diecasting of lightweight metals. Further details of the invention will be apparent from the appended claims, and from the description that follows and the working examples.

BACKGROUND OF THE INVENTION

In the metal casting of workpieces that are to have cavities, undercuts or the like, cores are inserted into the casting mold in order to keep the corresponding regions of the mold free of the metal melt.

Diecasting is understood to mean an industrial casting method in which, for series and mass production of castings, a metal melt is introduced under high pressure (10 MPa to 200 MPa) and with a high mold fill rate (up to 12 m/s) into a two- or multipart permanent mold, where it solidifies. Especially suitable for diecasting are low-melting metals, for example aluminum and magnesium, and alloys containing aluminum and/or magnesium.

In cores that are inserted into the mold in the diecasting of workpieces from metal, in order to keep the cavities envisaged in the workpieces clear in the course of filling of the molds with the melt, high demands are made with regard to dimensional stability thereof under mechanical and thermal stress during the casting operation and with regard to easy demoldability from the cavities after the casting operation.

WO 2011/151420 A1 discloses cores based on salt (e.g. sodium chloride) that are producible by shaping and compacting a core material mixture consisting of at least one salt, at least one binder (e.g. waterglass) and optionally auxiliaries such as additives, wetting agents and catalysts, wherein the salt, the binder and any auxiliaries used are inorganic, these core materials are soluble with water as solvent, the parts are shaped and compacted by core shooting or pressing, and the compacted cores are stabilized by an infiltrate. The cores may additionally be provided with a refractory coating. However, the production of salt cores is relatively complex, and the use thereof is associated with some drawbacks, such as high weight, brittleness, and low storage stability on account of the hygroscopicity of water-soluble salts. The demolding of the casting by dissolution of the salt cores results in a solution which has to be dried in order to recover the salt, or which has to be disposed of.

US 2018/0318912 A1 discloses a core for use in the diecasting of aluminum, wherein the core comprises a combination of a synthetic ceramic mold base material, a sodium silicate-containing inorganic binder and an additive containing particulate amorphous silicon dioxide. The core may have a refractory coating; this is intended to prevent penetration of aluminum that has melted during the diecasting from penetrating through the surface into the core. Suitable refractories specified for the refractory coating are zirconium oxide and aluminum oxide, which are to be used in the form of fine powders.

WO 2013/044904 A1 discloses a refractory coating composition comprising
 (A) at least the following clays:
  (A1) 1 to 10 parts by weight of palygorskite,
  (A2) 1 to 10 parts by weight of hectorite and
  (A3) 1 to 20 parts by weight of sodium bentonite, based on the ratio of components (A1), (A2) and (A3) relative to one another, and
 (B) a carrier liquid containing water which is fully evaporable at up to 160° C. and 1013 mbar, and (C) refractories other than (A).

The total clay content A1, A2 and A3 of the refractory coating is preferably 0.1 by weight to 4.0% by weight in total, based on the solids content of the refractory coating composition. The refractories (C) are preferably quartz, aluminum oxide, zirconium dioxide, aluminum silicates, zirconium sands, zirconium silicates, olivine, talc, mica, graphite, coke, feldspar, diatomite, kaolins, calcined kaolins, kaolinite, metakaolinite, iron oxide, bauxite and/or mixtures thereof. If the refractory coating composition is used as a concentrate, the proportion of the refractory (C) in the refractory coating composition is greater than 70% by weight, preferably greater than 80% by weight, based in each case on the solids content of the refractory coating composition.

DE 10 2005 041 863 A1 discloses a molding compound for the production of casting molds for the foundry industry, at least comprising a refractory molding material, a binder for curing of the molding compound, and a proportion of a borosilicate glass.

DE 10 2014 004 914 A1 discloses a casting mold and a casting mold core made of molding sand for metal casting, wherein a first layer is disposed on the surface of molding sand grains of the molding sand, wherein the first layer has been cured and consists of waterglass and/or phosphate glass.

WO 2013/044904 A1, DE 10 2005 041 863 A1 and DE 10 2014 004 914 A1 do not relate to the technical field of diecasting.

There is a constant need in the foundry industry for cores suitable for diecasting, and for suitable starting materials and methods for the production of cores suitable for use in diecasting.

SUMMARY OF THE INVENTION

A first aspect of the invention relates to a kit for production of cores for use in diecasting. The kit of the invention comprises, as separate components,
 (A) a mold base material selected from the group consisting of quartz sand, chromium ore sand, olivine sand, aluminum silicate sands and mixtures thereof;
 (B) particulate amorphous silicon dioxide or an additive mixture comprising particulate amorphous silicon dioxide;
 (C) a solution or dispersion comprising waterglass or a kit comprising raw materials for production of a solution or dispersion comprising waterglass;
 (D) a composition for production of a coating, said composition comprising (D1) a carrier liquid selected from the group consisting of water and mixtures of water with one or more alcohols
(D2) a constituent from the group consisting of
  (D2a) dissolved in the carrier liquid, one or more acids, where the aqueous phase formed by the carrier liquid with the acids dissolved therein has a pH of 5 or less,
  (D2b) one or more organic compounds of the formula (I)

(I)

where R1 and R2
  are each monovalent groups independently containing 1 to 26 carbon atoms, where the R1 group is attached via a carbon atom present in the R1 group or via an oxygen atom present in the R1 group, and the R2 group via a carbon atom present in the R2 group, or
  are joined to one another to form a ring structure, such that the ring structure comprises a total of 4 to 7 ring atoms and the R1 and R2 groups comprise a total of 2 to 26 carbon atoms, where the R1 group is attached via a carbon atom present in the R1 group or via an oxygen atom present in the R1 group, and the R2 group via a carbon atom present in the R2 group;
(D3) one or more refractories in the form of platelet-shaped particles
(D4) one or more refractories in the form of grainy particles
  wherein the proportion of the refractories (D3) is in the range from 15% to 80%, preferably 30% to 60%, based on the total mass of refractories (D3) and refractories (D4) in component (D).

In the kit of the invention, components (A), (B), (C) and (D) are present separately, i.e. spatially separately from one another, for example each of components (A), (B), (C) and (D) in a separate vessel.

Components (A), (B) and (C) of the kit of the invention serve for production of a molding material mixture from which a main body for a core is produced by shaping and thermal curing. Component (D) of the kit of the invention is a refractory coating composition or a concentrate for production of a refractory coating composition. The refractory coating composition is a coating composition and serves for production of a coating (refractory coating) on the main body which extends at least over the entire surface of the core which comes into contact with a metal melt in the casting operation. The refractory coating preferably extends over the entire surface of the core.

DETAILED DESCRIPTION OF THE INVENTION

It has been found that, surprisingly, when cores of the invention are used in diecasting, in spite of the high pressure of the metal melt, penetration of the core surface by the metal melt is largely prevented. This is achieved by the refractory coating of the core of the invention.

Component (A) of the kit of the invention constitutes the mold base material of the molding material mixture to be produced from components (A), (B) and (C) of the kit. Preference is given to fine-grain mold base materials, especially with an AFS grain fineness number in the range from 50 to 100, more preferably with an AFS grain fineness number in the range from 60 to 80. The AFS grain fineness number is determined here according to VDG-Merkblatt (information sheet from the "Verein deutscher Gießereifachleute" [Society of German Foundry Experts]) P 34 of October 1999, point 5.2. The AFS grain fineness number is specified therein by the formula $$AFS \text{ grain fineness number} = \frac{\sum g_i \times M3}{g}$$

where
  $g_i$ are the proportions by mass of the individual grain classes
  $M3_i$ is the AFS multiplier for the respective grain class (according to table 3 of VDG-Merkblatt P34), and
  g total grain mass.

Mold base materials to be used in accordance with the invention are selected from the group consisting of quartz sand, chromium ore sand, olivine sand, aluminum silicate sands and mixtures thereof. The mold base material (A) is preferably quartz sand.

A particularly preferred mold base material is quartz sand with an AFS grain fineness number in the range from 50 to 100, more preferably with an AFS grain fineness number in the range from 60 to 80.

Components (B) and (C) of the kit of the invention form the binder of the molding material mixture to be produced from components (A), (B) and (C) of the kit.

The amorphous particulate silicon dioxide in component (B) is preferably selected from the group consisting of
  particulate synthetic amorphous silicon dioxide containing at least carbon as a secondary constituent, where the proportion of silicon dioxide is 90% or more, based on the total mass of the particulate synthetic amorphous silicon dioxide and of the secondary constituents, preferably producible by re-ducing quartz in an arc furnace;
  particulate synthetic amorphous silicon dioxide comprising oxides of zirconium as secondary constituent, preferably producible by thermal breakdown of $ZrSiO_4$;
  particulate synthetic amorphous silicon dioxide producible by oxidizing metallic silicon by means of an oxygenous gas;
  particulate synthetic amorphous silicon dioxide producible by quenching a silicon dioxide melt;
  fumed silica, preferably producible by pyrolysis of silicon tetrachloride; and mixtures thereof.

The term "particulate" refers to a solid powder (including dusts) or a granular material that is preferably free-flowing and hence also sievable.

The particulate amorphous silicon dioxide has preferably been produced synthetically. Synthetically produced particulate amorphous silicon dioxide in the context of the present text means that the amorphous silicon dioxide is the target product of a planned chemical reaction process for industrial synthesis of particulate amorphous silicon dioxide or a by-product of a planned chemical reaction process for industrial synthesis of a target product that is not particulate amorphous silicon dioxide.

One example of a reaction process with particulate amorphous silicon dioxide as its target product is the flame hydrolysis of silicon tetrachloride. The particulate amorphous $SiO_2$ ("silicon dioxide") produced by this process is also referred to as "pyrogenic $SiO_2$" ("pyrogenic silicon dioxide") or as pyrogenic silica or as fumed silica (CAS RN 112945-52-5).

One example of a reaction process in which particulate amorphous silicon dioxide is formed as a by-product is the reduction of quartz with coke, for example, in an arc furnace for production of silicon or ferrosilicon as target product. The particulate amorphous $SiO_2$ ("silicon dioxide") formed is also referred to as silica dust, silicon dioxide dust or $SiO_2$ fume condensate, "silica fume" or microsilica (CAS RN 69012-64-2).

A further reaction process in which particulate amorphous silicon dioxide is synthetically produced is the thermal breakdown of $ZrSiO_4$ to give $ZrO_2$ and $SiO_2$.

Particulate amorphous silicon dioxide is also obtainable by oxidation of metallic silicon by means of an oxygenous gas (for details see DE 10 2012 020 510 A1) and by quenching of a silicon dioxide melt.

The literature frequently refers to amorphous silicon dioxide formed by flame hydrolysis of silicon tetrachloride, to amorphous silicon dioxide formed as a by-product in the reduction of quartz with coke, for example, in the arc furnace and to amorphous silicon dioxide formed by thermal breakdown of $ZrSiO_4$ as "pyrogenic $SiO_2$" ("pyrogenic silicon dioxide") or as pyrogenic silica.

Particulate amorphous silicon dioxide of the type produced by reduction of quartz with carbon (e.g. coke) in an arc (in the production of ferrosilicon and silicon), as a result of its production, includes carbon as a secondary constituent, where the proportion of silicon dioxide is 90% or more, based on the total mass of the particulate synthetic amorphous silicon dioxide and the secondary constituents.

Particulate amorphous silicon dioxide of the type produced by thermal decomposition of $ZrSiO_4$, as a result of its production, includes oxides of zirconium as a secondary constituent, especially zirconium dioxide.

Particulate synthetic amorphous silicon dioxide producible by oxidation of metallic silicon by means of an oxygenous gas and particulate synthetic amorphous silicon dioxide producible by quenching a silicon dioxide melt are very pure $SiO_2$ having only a very small number of unavoidable impurities (i.e. those resulting from the production).

Particulate amorphous silicon dioxide to be used with particular preference in the context of the present invention includes those types of particulate amorphous silicon dioxide that are identified by CAS RN 69012-64-2 or by CAS RN 112945-52-5. These are obtainable as specified above. The "CAS RN" stands here for the CAS registry number and CAS register number (CAS=Chemical Abstracts Service).

Likewise particularly preferred is $SiO_2$ prepared by thermal breakdown of $ZrSiO_4$ to give $ZrO_2$ from $ZrSiO_4$, and $SiO_2$ obtained by flame hydrolysis of silicon tetrachloride.

Preference is given to particulate amorphous silicon dioxide having a particle size distribution having a median ($d_{50}$) in the range from 0.7 to 1.5 μm, determined by means of laser scattering. This determination of particle size distribution by means of laser scattering is based on the relationship between the size of a particle on the one hand and the angle and intensity of the light scattered by that particle on the other hand. The measured angles and intensities of the laser radiation which is scattered by the particles present in the sample can be used to obtain information about particle sizes by means of an algorithm based on Mie scattering theory.

In some cases, component (B) of the kit of the invention consists of amorphous particulate silicon dioxide.

In other cases, component (B) is a pulverulent additive mixture containing particulate amorphous silicon dioxide and further constituents. These further constituents are, for example, particulate inorganic materials (for details see below);
alkali metal hydroxides;
organosilicon compounds such as silanes, silicones and siloxanes;
waxes;
paraffins;
metal soaps;
carbohydrates, where the carbohydrates are preferably selected from the group consisting of oligo-saccharides, polysaccharides and mixtures thereof, more preferably from the group consisting of cellulose, cellulose esters, cellulose ethers, starch and dextrin.

The abovementioned particulate inorganic materials are likewise additives, the addition of which to molding material mixtures with waterglass as binder is known to the person skilled in the art from the prior art. Preference is given to particulate inorganic materials selected from the group consisting of aluminum oxide, preferably in the alpha phase; bauxite; mixed aluminum/silicon oxides;
oxides of zirconium, preferably zirconium(IV) oxide;
zinc oxide;
barium sulfate;
phosphorus compounds, where the phosphorus compounds are preferably selected from the group of the alkali metal phosphates and of the salts $M_5(PO_4)_3OH$ where M is an alkaline earth metal, preferably Ca;
sheet silicates;
graphite, carbon black;
glass beads; ceramic hollow beads;
oxides of magnesium.

In particular cases, component (B) of the kit of the invention is a pulverulent additive mixture comprising particulate amorphous silicon dioxide, where the total concentration of particulate amorphous silicon dioxide is preferably 25% to 99.5%, more preferably 40% to 95%, based on the total mass of the pulverulent additive mixture (B), and
one or more oxidic boron compounds, preferably selected from the group consisting of borates, boric acids, boric anhydrides, borosilicates, borophosphates and borophosphosilicates, where the total concentration of oxidic boron compounds is preferably 0.5% to 8%, more preferably 2% to 5%, based on the total mass of the pulverulent additive mixture (B).

Oxidic boron compounds in component (B) improve the stability of the molded articles produced from the molding material mixture with respect to water and air humidity. High stability with respect to water is important in order that the molded article, if at all possible, is not attacked to a significant degree by the water present in the carrier liquid (D1) on application of the coating composition (D). High stability with respect to air humidity improves the storage stability of the molded articles.

Component (C) of the kit of the invention is either a solution or dispersion comprising waterglass or a kit comprising raw materials for production of a solution or dispersion comprising waterglass.

"Waterglass" is understood to mean alkali metal silicates obtainable, for example, by melting quartz sand together with sodium carbonate or potassium carbonate at 1400° C. to 1500° C., or by hydrothermal methods. These alkali metal silicates are typically water-soluble.

Waterglass to be used in accordance with the invention preferably contains cations of one or more alkali metals from the group consisting of lithium, sodium and potassium.

The molar modulus $SiO_2/M_2O$ of the waterglass is preferably in the range from 1.6 to 4.0, where $M_2O$ denotes the total amount of oxides of alkali metals M.

Component (C) of the kits of the invention preferably has a content of alkali metal silicate (i.e. waterglass) in the range from 20% to 60%, preferably in the range from 25% to 55%, based on the total mass of component (C).

In a preferred variant, component (C) of the kit of the invention contains one or more oxidic boron compounds, preferably selected from the group consisting of borates, boric acids and boric anhydrides, more preferably sodium tetraborate decahydrate, where the total concentration of oxidic boron compounds calculated as B2O3 is 0.4% to 1.0%, more preferably 0.5% to 0.8%, based on the total mass of component (C).

Oxidic boron compounds in component (C) improve the stability of the molded articles produced from the molding material mixture with respect to water and air humidity.

In another preferred variant, component (C) of the kit of the invention is a solution or dispersion comprising lithium-containing waterglass, where the total concentration of lithium calculated as Li2O is preferably 0.4% to 1.0%, more preferably 0.4% to 0.7%, based on the total mass of component (C). "Lithium-containing waterglass" is understood here to mean alkali metal silicates that contain lithium ions and optionally ions of further alkali metals, typically sodium and/or potassium ions. Particular preference is given here to a solution or dispersion comprising lithium-containing waterglass with a molar modulus $SiO_2/M_2O$ in the range from 1.6 to 3.5, preferably in the range from 1.8 to 3.0, where the molar proportion of Li2O in $M_{2O}$ is in the range from 0.05 to 0.60, preferably in the range from 0.1 to 0.4, where $M_2O$ in each case denotes the total amount of lithium oxide, sodium oxide and potassium oxide.

Lithium-containing waterglass improves the stability of the molded articles produced from the molding material mixture with respect to water and air humidity.

In a further preferred variant, component (C) of the kit of the invention is a kit containing raw materials for production of a solution or dispersion comprising lithium-containing waterglass. In this variant, component (C) of the kit of the invention contains, as separate constituents, (C1) an aqueous solution or dispersion comprising waterglass, where, in constituent (C1), the content of $SiO_2$ is in the range from 20% to 34%, based on the total mass of the solution or dispersion, where constituent (C1) preferably has a pH in the range from 10.0 to 13.0, more preferably in the range from 11.0 to 12.5, (C2) a first waterglass-free solution or dispersion comprising lithium ions dissolved in water, where, in constituent (C2), the concentration of the lithium ions is in the range from 0.3 mol/L to 5.3 mol/L and the total concentration of the lithium, sodium and potassium ions is in the range from 0.3 mol/L to 28.0 mol/L, where constituent (C2) preferably has a pH in the range from 8.0 to 14.0, more preferably in the range from 11.5 to 12.3, and optionally (C3) a second waterglass-free solution or dispersion comprising alkali metal ions dissolved in water, where, in constituent (C3), the concentration of the lithium ions is lower than in constituent (C2) and is preferably in the range from 0.1 mol/L to 5.0 mol/L, more preferably in the range from 0.1 mol/L to 2.0 mol/L;

and the total concentration of the lithium, sodium and potassium ions is in the range from 0.3 mol/L to 28.0 mol/L and the total concentration of the lithium, sodium and potassium ions in constituent (C3) varies by not more than 20% from the total concentration of the lithium, sodium and potassium ions in constituent (C2), where constituent (C3) preferably has a pH in the range from 8.0 to 14.0, more preferably in the range from 11.5 to 13.5.

In this variant of component (C) of the kit of the invention, constituents (C1), (C2) and—if present—(C3) are present separately, i.e. spatially separately from one another, for example in separate containers.

In the waterglass of constituent (C1), the concentration of lithium ions is much smaller than in the lithium-containing waterglass to be produced. Constituent (C1) preferably does not contain any lithium ions.

The production of lithium-containing waterglass from the above-described raw materials is described in patent application WO 2019/002452 A1.

In component (D) of the kit of the invention, constituents (D1), (D2a) or (D2b), (D3) and (D4) are present, based in each case on the total mass of component (D), in the following concentration:

(D1) 20% to 75%
(D2a) 0.1% to 10% or (D2b) 0.1% to 10%
(D3) 10% to 58%
(D4) 14% to 64%.

In composition (D), there is an aqueous phase (water-containing liquid phase) for which the ratio of the mass of water to the total mass of the aqueous phase is greater than 50%, preferably greater than 70%, more preferably greater than 90%. This aqueous phase comprises the carrier liquid (D1) and constituents dissolved therein.

Compositions (D) as described above include both ready-to-use refractory coating compositions and concentrates for formation of ready-to-use refractory coating compositions. Ready-to-use refractory coating compositions have a sufficiently high content of carrier liquid (D1), such that they can be applied directly to the main body for formation of a refractory coating. In a ready-to-use refractory coating composition, the mass of the carrier liquid (D1) is 40% to 75%, preferably 60% to 75%, based on the total mass of the composition. Concentrates for production of a ready-to-use refractory coating composition contain a dis-tinctly smaller amount of carrier liquid (D1) compared to the ready-to-use refractory coating composition. In a concentrate, the total mass of the carrier liquid (D1) is 40% or less, based on the total mass of the composition. A ready-to-use refractory coating composition is obtainable by diluting the concentrate with a carrier liquid (D1). The concentrate is typically diluted using a carrier liquid (D1) present in the carrier liquid (D1) of the concentrate, preferably water.

The solids content of component (D) is less than 80%, preferably less than 75%, based on the total mass of component (D). The solids content of component (D) essentially comprises constituents (D3) and (D4). Solids are understood here to mean the constituents of component (D) present in solid form in component (D), i.e. not dissolved but suspended in the carrier liquid (D1). In a ready-to-use refractory coating composition, the proportion of constituents (D3) and (D4) is 25% to 60%, based on the total mass of the refractory coating composition. In a concentrate for production of a ready-to-use refractory coating composition, the solids content is greater than 40% but less than 80%, based on the total mass of the component (D).

As carrier liquid (constituent (D1)), component (D) of the kit of the invention contains water or a mixture of water and one or more alcohols, e.g. ethanol, methanol, isopropanol.

The carrier liquid (D1) serves merely as a vehicle for application of the substances suspended and dissolved therein to the main body of the core to be produced, and is removed in the course of drying of the main body coated with a composition (D) as defined above (for details see the disclosure in the context of the method of the invention described below). The carrier liquid is in liquid form under standard conditions (20° C. and 1013.25 hPa), and is evaporable under standard pressure (1013.25 hPa) at temperatures in the range from 80° C. to 200° C.

As constituent (D2), component (D) of the kit of the invention typically contains either (D2a) dissolved in the carrier liquid, one or more acids, where the aqueous phase formed by the carrier liquid with the acids dissolved therein has a pH of 5 or less, or (D2b) one or more organic compounds of the formula (I)

(I)

where R1 and R2
are each monovalent groups independently containing 1 to 26 carbon atoms, where the R1 group is attached via a carbon atom present in the R1 group or via an oxygen atom present in the R1 group, and the R2 group is attached via a carbon atom present in the R2 group,
or
are joined to one another to form a ring structure, such that the ring structure comprises a total of 4 to 7 ring atoms and the R1 and R2 groups comprise a total of 2 to 26 carbon atoms, where the R1 group is attached via a carbon atom present in the R1 group or via an oxygen atom present in the R1 group, and the R2 group via a carbon atom present in the R2 group.

Preference is given to compounds of the formula (I) in constituent (2b), in which R1 and R2
are each monovalent groups that are independently straight-chain or branched and contain 1 to 16, preferably 1 to 12, carbon atoms, which carbon atoms may each be replaced and/or substituted once to four times (i.e. once, twice, three times or four times) by oxygen and/or hydroxy, where the R1 group is attached via a carbon atom present in the R1 group or via an oxygen atom present in the group, and R2 via a carbon atom present in the R2 group,
or
are bonded to one another to form a ring structure in such a way that the ring structure comprises a total of 4 to 7, preferably 5 to 7, ring atoms selected from oxygen and carbon, and the R1 and R2 groups together comprise a total of 2 to 16, preferably 3 to 8, carbon atoms that are straight-chain or branched and may be replaced and/or substituted once to four times (i.e. once, twice, three times or four times), preferably once to twice, by oxygen and/or hydroxy, where the R1 group is attached via a carbon atom present in the R1 group or via an oxygen atom present in the R1 group, and the R2 group via a carbon atom present in the R2 group.

It has been found that constituents (D2a) and (D2b) result in an increase in the strength of the core provided with the refractory coating. It is currently assumed that acid is provided by constituent (D2a) or by hydrolysis of constituent (D2b) of component (D) of the kit of the invention, and this is capable, via an acid-base reaction, of recuring (healing) any alkali metal silicate skeleton of the waterglass-bound main body that has been attacked by the aqueous carrier liquid (D1) of the coating composition. It is also assumed that the acid-base reaction of the acid from constituent (D2a) or of the acid formed by hydrolysis of constituent (D2b) with the alkali metal silicate skeleton of the main body improves the attachment of the refractory coating to the main body.

When component (D) contains the above-defined constituent (D2a), it is preferable that the acids have a pKa<5, more preferably a pKa<4, each at 25° C. More preferably, the acids are selected from the group consisting of
organic acids selected from the group consisting of mono-, di- and tricarboxylic acids, preferably mono-, di- and tricarboxylic acids that are solid at 25° C. and 101.3 kPa, more preferably citric acid and oxalic acid,
and inorganic acids selected from the group consisting of hydrochloric acid, nitric acid, phosphoric acid and acidic phosphates, more preferably from the group consisting of hydrochloric acid, nitric acid and phosphoric acid.

When component (D) contains the above-defined constituent (D2b), it is preferable that the organic compounds of the formula (I) are selected from the group consisting of esters, lactones and acid anhydrides. Preference is given here to water-soluble esters, lactones and acid anhydrides. Particular preference is given to compounds of the formula (I) from the group consisting of methyl formate, ethyl formate, propylene carbonate, γ-butyrolactone, diacetin, triacetin, dibasic esters, acetic anhydride, methyl carbonate and ε-caprolactone. Particular preference is given to propylene carbonate.

Constituents (D3) and (D4) of component (D) are refractories. In accordance with the typical understanding of the person skilled in the art (cf. DIN 51060:2000-06), "refractory" masses, materials and minerals refer to those that can at least briefly withstand the thermal stress in the course of casting or solidifying of an iron melt. "Highly refractory" masses, materials and minerals refer to those that can briefly withstand the heat of casting of a steel melt. The temperatures that can occur in the casting of steel melts are usually higher than the temperatures that can occur in the casting of iron or cast iron melts. Refractory masses, materials and minerals (refractories) and highly refractory masses, materials and minerals are known to the person skilled in the art, for example from DIN 51060:2000-06. Suitable refractories are especially those materials that have melting points at least 200° C. above the temperature of the metal melt used in each case and/or do not enter into any reactions with the metal melt. The term "refractory" as used here also includes highly refractory substances.

Platelet-shaped particles (D3) in the context of the present invention are particles having three dimensions that extend at right angles to one another (length, width, thickness), where the length is the greatest and the thickness the smallest dimension, where there is no significant difference in length and width, and the thickness/length ratio is 0.2 or less. The length of the platelet-shaped particles (D3) is preferably in the range from 1 µm to 600 µm, further preferably 5 µm to 500 µm, further preferably 5 µm to 200 µm, more preferably 10 µm to 200 µm, especially 10 µm to 150 µm, 10 µm to 100 µm, or 10 µm to 80 µm. Particle dimensions are determined according to ISO 13322-2. The dimensions of these particles can be ascertained, for example, in a manner known to the person skilled in the art by means of a Camsizer. Particles of this kind are also referred to as flakes, leaves, scales or tablets. Platelet-shaped particles (D3) are obtainable, for example, by delamination (for example in a grinding operation) of sheet silicates or of graphites having a layered structure.

Suitable sheet silicates are those clay minerals that form part of the group of the sheet silicates, and also mica, talc, kaolins, metakaolins, calcined kaolins, pyrophyllites, illites and bentonites. Suitable graphites are macrocrystalline natural graphites and macrocrystalline synthetic graphites. Macrocrystalline natural graphites and macrocrystalline synthetic graphites are in the form of crystals apparent to the naked eye (platelets, leaves, scales or tablets), the extent of which in the c plane is in the range from 100 µm to a few millimeters.

Synthetic graphite is obtainable by the Acheson method, or by compression molding and combustion (800-1300° C.) of petcoke with addition of a binder (coal tar pitches) and subsequent electrographitization. Synthetic graphite is additionally present in the form of crystallites, the extent of which in the c plane is in the range from a few hundred Å (a few tens of nm) to a few millimeters. A usable refractory (D3) in the context of the present invention is macrocrystalline synthetic graphite in the form of crystallites having an extent in the c plane of 100 µm to a few millimeters, while microcrystalline synthetic graphite is usable as refractory (D4) in the context of the present invention (see below).

Natural graphite occurs both in macrocrystalline foliated form and in microcrystalline earthy form. A usable refractory (D3) in the context of the present invention is the macrocrystalline foliated form of natural graphite, whereas the microcrystalline earthy form is usable as refractory (D4) in the context of the present invention (see below).

The refractories (D3) in the form of platelet-shaped particles are preferably selected from the group consisting of macrocrystalline graphites, α-boron nitride and sheet silicates. Preferred sheet silicates are powdered clays (composed of clay minerals that form part of the group of the sheet silicates), mica, talc, kaolins, metakaolins, calcined kaolins, pyrophyllites, illites and bentonites. Particular preference is given to pyrophyllites and powdered clays.

Grainy particles (D4) in the context of the present invention are particles having three mutually perpendic-ular dimensions (length, width, thickness), with no significant difference in thickness and width, and the thickness/length ratio being in the range from 0.8 to 1. Grainy particles (D4) in the context of the present invention thus also include spherical particles (for details see below). The length of the grainy particles (D4) is preferably in the range from 10 nm to 250 µm, preferably 50 nm to 200 µm, more preferably 50 nm to 100 µm, especially 100 nm to 50 µm or 100 nm to 20 µm. Particle dimensions are determined according to ISO 13322-2. The dimensions of these particles can be ascertained, for example, in a manner known to the person skilled in the art by means of a Camsizer.

Grainy particles having sharp edges are also referred to in practice as splintery particles; these are among the grainy particles in the context of the present invention. Grainy, especially splintery, particles (D4) are obtainable, for example, by crushing (for example in a grinding operation) of glasses, monocrystalline sands or polycrystalline sands or rocks.

The refractories (D4) in the form of grainy particles are preferably selected from the group consisting of microcrystalline graphites, carbon black, coke, zirconium silicate, andalusite, sillimanite, kyanite, quartz, quartz glass, mullite, fireclay, aluminum oxides, bauxite, wollastonite, titanium dioxides, olivine, alkaline earth metal phosphates of the composition $M_5(PO_4)_3OH$ where M is an alkaline earth metal, preferably Ca, silicon nitride and rutile. Particular preference is given to zirconium silicate and microcrystalline graphite.

Carbon black is a form of carbon which forms in the event of incomplete combustion or thermal cracking of vaporous carbon-containing substances. Coke is obtainable by heating bituminous coal, brown coal or peat with exclusion of air to temperatures of about 800° C.

Suitable microcrystalline graphites are microcrystalline natural graphites (earthy natural graphites) and microcrystalline synthetic graphites. Microcrystalline natural graphites and microcrystalline synthetic graphites are in the form of crystallites having an expansion in the c plane of less than 100 µm; the individual crystallites are therefore apparent only under the microscope.

In component (D) of the kit of the invention, the proportion of the refractories (D3) is in the range from 15% to 80%, preferably 30% to 60%, and the proportion of the refractories (D4) is in the range from 85% to 20%, preferably in the range from 70% to 40%, based in each case on the total mass of refractories (D3) and refractories (D4). This is also applicable to ready-to-use refractory coating compositions produced by diluting component (D) of the kit of the invention.

A distinction between platelet-shaped particles (D3) on the one hand and grainy particles (D4) on the other hand is possible, for example, using two-dimensional microscope images of the corresponding particles. Further options for distinction between platelet-shaped particles (D3) on the one hand and grainy particles (D4) are sedimentation methods or granulometry. These methods are known to the person skilled in the art.

In a preferred variant, constituent (D4) of component (D) of the kit of the invention further comprises (D4a) amorphous particulate silicon dioxide.

It has been found that, surprisingly, constituent (D4a) contributes to increasing the strength of the core provided with the refractory coating and improves the attachment of the refractory coating to the main body that likewise contains amorphous particulate silicon dioxide (from component (B)). Preferably, the proportion of amorphous particulate silicon dioxide (D4a) is 3% to 30%, based on the total mass of the refractories (D4).

With regard to the features of the amorphous particulate silicon dioxide and the selection of suitable types of amorphous particulate silicon dioxide, the above remarks relating to component (B) of the kit of the invention are correspondingly applicable. Preferably, the same type of amorphous particulate silicon dioxide is used in component (B) of the kit of the invention and in constituent (D4) of component (D) of the kit of the invention.

The primary particles of the amorphous silicon dioxide are frequently in agglomerated form after the abovementioned production processes, i.e. in the form of agglomerates of primary particles. The particle shape of the primary particles of the particulate amorphous silicon dioxide (D4a) is preferably approximately spherical, where the sphericity is 0.9 or more. Sphericity in the context of the present invention is defined as the circumference of the circle of equal area (Equivalent Projection Area of a Circle, EQPC for short) of a particle divided by the actual circumference of the particle. For particles having a particle size of less than 5 μm, the particle circumference is preferably ascertained, as required for the determination of sphericity, by the standard test method according to ISO 13322-1:2014, and for particles having a particle size of greater than 5 μm preferably by the standard test method according to ISO 13322-02:2006. Modern standard electron microscopy or light microscopy systems enable digital image analysis, and hence comfortable determination of particle shape. Digital image analysis is preferred for analyses for sphericity. Digital image analysis is preferably conducted by means of commercial image analysis software, for example the Image-Pro Plus software from Media Cybernetics. In the case of sample preparation for digital image analysis, random orientation of the particles should be ensured. It may be necessary to produce thin sections.

Preferably,
(D3) the refractories in the form of platelet-shaped particles are selected from the group consisting of macrocrystalline graphites, α-boron nitride and sheet silicates, where the sheet silicates are preferably selected from the group consisting of powdered clays (composed of clay minerals that form part of the group of the sheet silicates), mica, talc, kaolins, metakaolins, calcined kaolins, pyrophyllites, illites and bentonites, and
(D4) the refractories in the form of grainy or splintery particles are selected from the group consisting of microcrystalline graphites, carbon black, coke, zirconium silicate, andalusite, sillimanite, kyanite, quartz, quartz glass, mullite, fireclay, aluminum oxides, bauxite, wollastonite, titanium dioxides, olivine, alkaline earth metal phosphates of the composition $M_5(PO_4)_3OH$ where M is an alkaline earth metal, preferably Ca, silicon nitride and rutile.

In a particularly preferred variant, constituent (D3) is formed by sheet silicates, e.g. pyrophyllite and/or powdered clay, and constituent (D4) is formed by microcrystalline graphite and zirconium silicate (in a mass ratio of 2:3 to 3:2). The proportion of the refractories (D3) here is preferably 40% to 60%, based on the total mass of refractories (D3) and refractories (D4). Preferably, constituent (D4) additionally contains (D4a) amorphous particulate silicon dioxide.

The inventive combination of the particulate constituents (D3) and (D4) in component (D) achieves the effect that the refractory coating composition (D) or a refractory coating composition produced by diluting component (D) combines the effects of a hiding refractory coating (top coating) and a penetrating refractory coating. Top coatings typically contain predominantly platelet-shaped refractories; penetrating coatings typically contain predominantly grainy refractories. On application to a main body formed from a molding material mixture as described above, the particulate refractories present in top coatings form a covering layer on the molding material of the main body that comes into direct contact with the melt in the casting operation, meaning that the surface of the main body is sealed. In other words, on application of a top coating to a main body formed from a molding material mixture as described above, the particulate refractories present in the top coating form a covering layer on the molding material of the main body that comes into direct contact with the melt in the casting operation, meaning that the surface of the main body is sealed. Top coatings penetrate less than about 2 mm into the molding material. By contrast, penetrating coatings penetrate deeper into the molding material, such that the particulate refractories present in such a refractory coating fill the pores in the molding material. Application of a refractory coating composition comprising the inventive combination of the particulate constituents (D3) and (D4) achieves the effect that both pores in the molding material are filled and a covering layer is formed on the molding material that comes into direct contact with the melt (cf. also the remarks below in the context of cores of the invention).

Component (D) of the kit of the invention may include further constituents that are typically present in compositions (D) for production of refractory coatings, especially constituents selected from the group consisting of wetting agents, rheological additives, binders, suspension aids and biocides. Suitable wetting agents, rheology additives, binders, suspension aids and biocides, and their function and effect, are known to the person skilled in the art. If any of these constituents (e.g. rheology additives) is a refractory in the form of platelet-shaped particles (D3) as defined above or a refractory in the form of grainy particles (D4) as defined above, it is counted as part of constituent (D3) or (D4) as defined above.

In an alternative variant, a kit of the invention contains, as separate components,
(A) a mold base material selected from the group consisting of quartz sand, chromium ore sand, olivine sand, natural aluminum silicate sands and mixtures thereof
(B) particulate amorphous silicon dioxide or an additive mixture comprising particulate amorphous silicon dioxide
(C) a solution or dispersion comprising waterglass or a kit comprising raw materials for production of a solution or dispersion comprising waterglass
(D) a composition for production of a coating, said composition comprising
(D1) a carrier liquid selected from the group consisting of water and mixtures of water with one or more alcohols
(D2) a constituent from the group consisting of
(D2a) dissolved in the carrier liquid, one or more acids, where the aqueous phase formed by the carrier liquid with the acids dissolved therein has a pH of 5 or less,
(D2b) one or more organic compounds of the formula (I)

(I)

where R1 and R2
are each monovalent groups independently containing 1 to 26 carbon atoms, where the R1 group is attached via a carbon atom present in the R1 group or via an oxygen atom present in the R1 group, and the R2 group via a carbon atom present in the R2 group, or are joined to one another to form a ring structure, such that the ring structure comprises a total of 4 to 7 ring atoms and the R1 and R2 groups comprise a total of 2 to 26 carbon atoms, where the R1 group is attached via a carbon atom present in the R1 group or via an oxygen atom present in the R1 group, and the R2 group is attached via a carbon atom present in the R2 group;

(D3) one or more refractories from the group consisting of macrocrystalline graphites, α-boron nitride and sheet silicates;

(D4) one or more refractories from the group consisting of microcrystalline graphites, carbon black, coke, zirconium silicate, andalusite, sillimanite, kyanite, quartz, quartz glass, mullite, fireclay, aluminum oxides, bauxite, wollastonite, titanium dioxides, olivine, alkaline earth metal phosphates of the composition $M_5(PO_4)_3OH$ where M is an alkaline earth metal, preferably Ca, silicon nitride and rutile;

wherein the proportion of the refractories (D3) is in the range from 15% to 80%, preferably 30% to 60%, based on the total mass of refractories (D3) and refractories (D4) in component (D).

With regard to components (A) to (C) and with regard to constituents (D1), (D2a) and (D2b) of component (D), and also with regard to optional further constituents of component (D) selected from the group consisting of wetting agents, rheological additives, binders, suspension aids and biocides, the above remarks are applicable mutatis mutandis.

In component (D) of the kit of the invention, the proportion of the refractories (D3) is in the range from 15% to 80%, preferably 30% to 60%, and the proportion of the refractories (D4) is in the range from 85% to 20%, preferably in the range from 70% to 40%, based in each case on the total mass of refractories (D3) and refractories (D4). This is also applicable to ready-to-use refractory coating compositions produced by diluting component (D) of the kit of the invention.

Suitable sheet silicates (D3) are clay minerals that form part of the group of the sheet silicates, and also mica, talc, kaolins, metakaolins, calcined kaolins, pyrophyllites, illites and bentonites. Particularly preferred constituents (D3) are pyrophyllites and powdered clays (of clay minerals that form part of the group of the sheet silicates). As constituent (D4), particular preference is given to microcrystalline graphite and zirconium silicate.

In a preferred variant, constituent (D4) of component (D) of the above-described alternative variant of the kit of the invention further comprises (D4a) amorphous particulate silicon dioxide.

Preferably, the proportion of amorphous particulate silicon dioxide (D4a) is 3% to 30%, based on the total mass of the refractories (D4).

With regard to the features of the amorphous particulate silicon dioxide and the selection of suitable types of amorphous particulate silicon dioxide, the above remarks relating to component (B) of the kit of the invention are correspondingly applicable. Preferably, the same type of amorphous particulate silicon dioxide is used in component (B) of the alternative variant of the kit of the invention and in constituent (D4) of component (D) of the alternative variant of the kit of the invention.

In a preferred variant, constituent (D3) is formed by sheet silicates, e.g. pyrophyllite and/or powdered clay, and constituent (D4) is formed by microcrystalline graphite and zirconium silicate (in a mass ratio of 2:3 to 3:2). The proportion of the refractories (D3) here is preferably 40% to 60%, based on the total mass of refractories (D3) and refractories (D4). Preferably, constituent (D4) additionally contains (D4a) amorphous particulate silicon dioxide.

Component (D) of the alternative variant of the kit of the invention may include further constituents that are typically present in compositions for production of refractory coatings, especially constituents selected from the group consisting of wetting agents, rheological additives, binders, suspension aids and biocides. Suitable wetting agents, rheology additives, binders, suspension aids and biocides, and their function and effect, are known to the person skilled in the art. If any of these constituents (e.g. rheology additives) is a refractory in the form of platelet-shaped particles (D3) as defined above or a refractory in the form of grainy particles (D4) as defined above, it is counted as part of constituent (D3) or (D4) as defined above.

A second aspect of the present invention relates to a process for producing cores for use in diecasting, comprising the steps of (a) producing a molding material mixture by mixing components (A), (B) and (C)

(b) shaping the molding material mixture (c) thermally curing the shaped molding material mixture to form a main body of the core to be produced (d) applying a composition (D)

or a coating composition formed by diluting a composition (D) with carrier liquid (D1)

to the main body and then drying, such that a coating is produced on the main body, forming a core comprising the main body and a coating disposed atop the main body, which extends at least over the entire surface of the core that comes into contact with a metal melt in the casting operation.

In step (a) of the method of the invention, the spatially separate components (B) and (C) of the kit of the invention are mixed simultaneously or successively into the mold base material (component (A) of the kit of the invention).

In particular cases, it is preferable that component (B) of the kit of the invention is mixed first into the mold base material (component (A) of the kit of the invention), such that a preliminary mixture comprising components (A) and (B) of the kit of the invention is formed, and component (C) of the kit of the invention is mixed into the preliminary mixture thus obtained (i.e. an aqueous solution or dispersion containing waterglass or raw materials for production of a solution or dispersion comprising waterglass as described above), such that the molding material mixture is obtained.

In other cases, it is preferable that component (C) of the kit of the invention is mixed in (i.e. an aqueous solution or dispersion containing waterglass or raw materials for production of a solution or dispersion comprising waterglass) is mixed into the mold base material (component (A) of the kit of the invention), such that a preliminary mixture comprising components (A) and (C) of the kit of the invention is formed, and component (B) of the kit of the invention is mixed into the preliminary mixture thus obtained, such that the molding material mixture is obtained.

The mold base material (component (A) of the kit of the invention as defined above) preferably accounts for more than 80% by weight, preferably more than 90% by weight, more preferably more than 95% by weight, of the total mass of a molding material mixture produced in step (a).

In a molding material mixture produced in step (a) of the method of the invention, the concentration of the particulate amorphous silicon dioxide from component (B) of the kit of the invention is preferably 0.05% to 3.0%, further preferably 0.1% to 2.0%, especially preferably 0.3% to 1.5%, based on the total mass of the mold base material.

In step (a) of the method of the invention, component (C) of the kit of the invention is added, preferably in an amount of 0.2% to 3%, more preferably 0.3% to 2%, based on the total mass of the mold base material.

A molding material mixture produced in step (a) of the method of the invention is preferably in a free-flowing form, such that it can be introduced easily into a mold for shaping and compacted therein. The compaction of the molding material mixture in the mold serves to increase the strength of foundry molds or foundry cores produced from the molding material mixture.

The molding material mixture is typically shaped in step (b) of the method of the invention in a mold. The molding material mixture is preferably introduced into the mold by means of compressed air.

The thermal curing in step (c) of the method of the invention is preferably effected at temperatures in the range from 100° C. to 300° C., more preferably 100° C. to 250° C.

The thermal curing of the binder system is effected by chemical reaction of constituents of the binder system with one another, so as to result in a molded article (main body of the core to be produced). The cause of the thermal curing of the binder system is essentially the condensation of the waterglass, i.e. the linkage of the silicate units of the waterglass to one another (the reaction mechanism was described in detail in the technical literature). For this purpose, water is removed from the binder system by the thermal treatment.

The heating of the shaped molding material mixture for thermal curing of the binder system can be effected, for example, in a mold having temperatures exceeding 100° C., preferably temperatures of 100° C. to 300° C., more preferably temperatures of 120° C. to 250° C. The thermal curing of the binder system in the shaped molding material mixture is preferably effected entirely or at least partly in a customary mold for industrial manufacture of molded articles.

The binder system in the shaped molding material mixture can be thermally cured here in suitable equipment and/or using suitable apparatus (such as conduits, pumps etc.) in which the thermal curing is assisted by controlled aeration of the shaped molding material mixture with air at controlled temperature. For this purpose, the air is preferably heated to 100° C. to 250° C., more preferably to 110° C. to 180° C. Although air contains carbon dioxide, this in the context of the present invention does not correspond to curing by the $CO_2$ method known from the prior art for curing of waterglass, which requires the specific aeration of the shaped molding material mixture with a $CO_2$-rich gas, especially in suitable equipment and/or using suitable apparatus (such as conduits, pumps etc.). What preferably does not take place in the context of the thermal curing envisaged in accordance with the invention or in combination therewith is aeration of the shaped molding material mixture with a gas containing $CO_2$ in a concentration elevated relative to its concentration in air.

The period of time for the thermal curing, i.e. including the period of time for the heating and for the controlled aeration of the shaped molding material mixture with air at controlled temperature, can be varied according to the requirements of the individual case and depend, for example, on the size and geometric characteristics of the shaped molding material mixture. Flow rate and/or volume flow of the air at controlled temperature in the controlled aeration of the shaped molding material mixture are preferably adjusted such that sufficient curing of the shaped molding material mixture for further processing or use is achieved within an acceptable period of time for industrial use, preferably a very short period of time (for details see further down). A period of less than 5 minutes is preferred in the context of the present invention, more preferably less than 2 minutes. In the case of very large molded articles, according to the requirements of the individual case, however, longer periods of time may also be required.

The shaped molding material mixture may already have largely cured within the mold.

The method of the invention does not require complete curing of the binder system during thermal treatment. "Thermal curing" in the context of the method of the invention as described above thus does not include the complete curing of the binder. This corresponds to the understanding of the person skilled in the art of the term "curing", since it cannot be expected for reasons of reaction kinetics that the binder system will react throughout the volume of the shaped molding material mixture during the relatively short period of thermal treatment. In this respect, the person skilled in the art is aware of the phenomenon of further curing of the binder system (which has been thermally cured for example) in a molded article, for example a foundry mold or a foundry core.

It is thus also possible in accordance with the invention to first cure the binder system in the mold only in an edge region of the shaped molding material mixture, such that a sufficient strength (green strength) is achieved in order to be able to remove the shaped molding material mixture from the mold. Subsequently, the shaped molding material mixture can be cured further by removing further water (for example in a furnace or by evaporating the water under reduced pressure or in a microwave oven).

The thermal curing can also be brought about or assisted by the action of microwaves or by the action of electromagnetic radiation, especially infrared radiation, on the shaped molding material mixture.

Thermal curing can likewise be brought about or assisted by passage of electrical current through the shaped molding material mixture, preferably uniform and more preferably also homogeneous passage of current or by preferably uniform and more preferably homogeneous application of an electromagnetic field through or to the formed molding material mixture. This heats the molding material mixture, preferably uniformly, and hence cures it particularly uniformly and ultimately in a high-quality manner. Details are dis-closed in DE 10 2017 217098 B3 and the literature cited therein.

In step (d) of the method of the invention, a composition (D) is applied to the surface of the main body, or a coating composition formed by diluting a composition (D) with carrier liquid (D1). When component (D) of the kit of the invention is not in the form of a ready-to-use refractory coating but of a concentrate (proportion of the carrier liquid (D1) 40% or less, based on the total mass of the composition (D)), by diluting this concentrate with carrier liquid (D1), a coating composition (ready-to-use refractory coating) is first prepared that has a proportion of carrier liquid (D1) of 40% to 75% based on the total mass of the coating composition, or a coating composition having a proportion of constituents (D3) and (D4) of 25% to 60% based on the total mass of the coating composition, and the coating composition thus formed is applied to the surface of the main body. The concentrate is typically diluted using a carrier liquid (D1) present in the carrier liquid (D1) of the concentrate, typically water.

In the coating composition applied in step (d), the proportion of the refractories (D3) is in the range from 15% to 80%, preferably 30% to 60%, and the proportion of the refractories (D4) is in the range from 85% to 20%, preferably in the range from 70% to 40%, based in each case on the total mass of refractories (D3) and refractories (D4).

In the application of the composition (D) or of the coating composition formed therefrom, the main body is preferably at a temperature of less than 80° C., preferably in the range from 15° C. to 35° C. When the main body after the thermal curing (step (c)) has been cooled down to a temperature of less than 80° C., preferably in the range from 15° C. to 35° C., the binder has attained sufficient stability in the main body, such that the waterglass-bound main body has sufficient water resistance when it comes into contact with the aqueous coating composition.

The application of the composition (D) or of the coating composition formed therefrom to the surface of the main body may be by any suitable technique. The composition is preferably applied to the surface of the main body so as to result in a core having a coating formed from the composition (D) or the coating composition produced therefrom that extends at least over the entire surface of the core that comes into contact with a metal melt in the casting operation. The refractory coating preferably extends over the entire surface of the core. Preferably, the composition (D) or the coating composition formed therefrom is applied to the surface of the main body by a method selected from the group consisting of spraying, dipping, flow coating and painting, more preferably dipping.

The composition (D) or the coating composition formed therefrom is preferably applied so as to result in a wet layer thickness in the range from 25 μm to 600 μm, preferably 150 μm to 350 μm.

After the application of the composition (D) or the coating composition formed therefrom to the surface of the main body, the carrier liquid (D1) is removed by drying and hence a coating is formed on the main body. In this way, a core is formed, comprising the main body and a coating disposed atop the main body, which extends at least over the entire surface of the core that comes into contact with a metal melt in the casting operation. The refractory coating preferably extends over the entire surface of the core. The drying of the composition (D) applied to the surface of the main body or of the coating composition produced by diluting the composition (D) is preferably effected at temperatures in the range from 80° C. to 220° C., further preferably at temperatures in the range from 100° C. to 140° C., more preferably at temperatures in the range from 105° C. to 120° C.

A third aspect of the present invention relates to a core for use in diecasting. A core of the invention comprises
 (i) a main body comprising
  (A) a mold base material selected from the group consisting of quartz sand, chromium ore sand, olivine sand, aluminum silicate sands and mixtures thereof;
  and
  (B) particulate amorphous silicon dioxide bound by waterglass and
 (ii) a coating disposed atop the main body, which extends at least over the entire surface of the core that comes into contact with a metal melt in the casting operation, where the coating comprises:
  (D3) one or more refractories in the form of platelet-shaped particles
  (D4) one or more refractories in the form of grainy particles
  wherein the proportion of the refractories (D3) is in the range from 15% to 80%, preferably 30% to 60%, based on the total mass of refractories (D3) and refractories (D4).

With regard to components (A) and of (B) the main body (i) and with regard to constituents (D3) and (D4) of the coating (ii) of the core of the invention, the above remarks relating to the corresponding components and constituents of the kit of the invention are applicable mutatis mutandis.

In the coating (ii) of the core of the invention, the proportion of the refractories (D3) is in the range from 15% to 80%, preferably 30% to 60%, and the proportion of the refractories (D4) is in the range from 85% to 20%, preferably in the range from 70% to 40%, based in each case on the total mass of refractories (D3) and refractories (D4).

The refractories (D3) are preferably selected from the group consisting of macrocrystalline graphites (as defined above), α-boron nitride and sheet silicates. Suitable sheet silicates (D3) are clay minerals that form part of the group of the sheet silicates, and also mica, talc, kaolins, metakaolins, calcined kaolins, pyrophyllites, illites and bentonites.

Particularly preferred constituents (D3) are pyrophyllites and powdered clays (of clay minerals that form part of the group of the sheet silicates). As constituent (D4), particular preference is given to microcrystalline graphite and zirconium silicate.

The refractories (D4) in the form of grainy particles are preferably selected from the group consisting of microcrystalline graphites, carbon black, coke, zirconium silicate, andalusite, sillimanite, kyanite, quartz, quartz glass, mullite, fireclay, aluminum oxides, bauxite, wollastonite, titanium dioxides, olivine, alkaline earth metal phosphates of the composition $M_5(PO_4)_3OH$ where M is an alkaline earth metal, preferably Ca, silicon nitride and rutile. Particular preference is given to zirconium silicate and microcrystalline graphite.

In a preferred variant, constituent (D4) of component (D) of the coating of the above-described core of the invention further comprises
 (D4a) amorphous particulate silicon dioxide.

Preferably, the proportion of amorphous particulate silicon dioxide (D4a) is 3% to 30%, based on the total mass of the refractories (D4).

In a preferred variant, constituent (D3) is formed by sheet silicates, e.g. pyrophyllite and/or powdered clay, and constituent (D4) is formed by microcrystalline graphite and zirconium silicate (in a mass ratio of 2:3 to 3:2). The proportion of the refractories (D3) here is 40% to 60%, based on the total mass of refractories (D3) and refractories (D4). Preferably, constituent (D4) additionally contains (D4a) amorphous particulate silicon dioxide.

The coating (ii) fills interstices between the particles of the mold base material at the surface of the main body (i) of the core of the invention, and a top layer that comes into contact with a metal melt in the casting operation is formed on the main body (i). It has been found that, surprisingly, in the course of drying of the coating composition, the platelet-shaped particles of constituent (D3) become aligned with their longest dimension parallel to the core surface, and hence also result in a corresponding alignment of the grainy particles of constituent (D4). In the absence of platelet-shaped particles (not in accordance with the invention), by contrast, it is regularly observed that grainy particles are deposited entirely randomly, i.e. without any particular alignment, on the surface of the core, i.e. of the main body. It is assumed that the alignment of the platelet-shaped particles of constituent (D3) and of the grainy particles of constituent (D4) parallel to the core surface achieves the effect that the core surface offers very low flow resistance to the metal melt.

Without being tied to any particular theory, it is currently assumed that, in a core of the invention, at the surface of the main body (i), interstices between the particles of the mold base material are at least partly filled by grainy particles of constituent (D4) of the coating (ii), while the platelet-shaped particles of constituent (D3) of the coating (ii) cover and occlude the cavities. The coating (ii) of a core of the invention is therefore virtually free of macroscopic pores and cavities. Macroscopic pores are understood to mean pores that are clearly apparent to the naked eye and have a size of 0.05 mm or greater.

By virtue of the grainy particles filling interstices between the particles of the mold base material at the surface of the main body, a relatively flat and smooth surface is produced, on which the platelet-shaped particles can be aligned in turn.

For instance, in accordance with the invention, the interaction of constituents (D3) and (D4) achieves the effect that a core of the invention, in diecasting, has a high penetration resistance with respect to the metal melt.

By contrast with the salt-based cores described in WO 2011/151420 A1, a core of the invention contains salts soluble with water as solvent (as described in WO 2011/151420 A1) in a concentration of less than 8%, preferably less than 5%, more preferably less than 3%, less than 2%, less than 1%, based on the total mass of the core. More preferably, the core of the invention does not contain any salts that are soluble with water as solvent (as described in WO 2011/151420 A1).

A core of the invention is producible by the method of the invention as described above.

In an alternative variant, a core of the invention comprises
(i) a main body comprising
  (A) a mold base material selected from the group consisting of quartz sand, chromium ore sand, olivine sand, aluminum silicate sands and mixtures thereof and
  (B) particulate amorphous silicon dioxide bound by waterglass
and
(ii) a coating disposed atop the main body, which forms a surface of the core that comes into contact with a metal melt in the casting operation, where the coating comprises:
  (D3) one or more refractories from the group consisting of a macrocrystalline graphite, α-boron nitride and sheet silicates;
  (D4) one or more refractories from the group consisting of microcrystalline graphites, carbon black, coke, zirconium silicate, andalusite, sillimanite, kyanite, quartz, quartz glass, mullite, fireclay, aluminum oxides, bauxite, wollastonite, titanium dioxides, olivine, alkaline earth metal phosphates of the composition $M_5(PO_4)_3OH$ where M is an alkaline earth metal, preferably Ca, silicon nitride and rutile;
  wherein the proportion of the refractories (D3) is in the range from 15% to 80%, preferably 30% to 60%, based on the total mass of refractories (D3) and refractories (D4).

The refractories (D3) are preferably selected from the group consisting of macrocrystalline graphites (as defined above), α-boron nitride and sheet silicates. Suitable sheet silicates (D3) are clay minerals that form part of the group of the sheet silicates, mica, talc, kaolins, metakaolins, calcined kaolins, pyrophyllites, illites and bentonites.

The proportion of the refractories (D3) is in the range from 15% to 80%, preferably 30% to 60%, and the proportion of the refractories (D4) is in the range from 85% to 20%, preferably in the range from 70% to 40%, based in each case on the total mass of refractories (D3) and refractories (D4).

With regard to components (A) of [the] (B) the main body (i) of the core of the invention, the above remarks relating to the corresponding components and constituents of the kit of the invention are applicable mutatis mutandis.

In a preferred variant, constituent (D4) of component (D) of the coating of the above-described alternative variant of the core of the invention further comprises
  (D4a) amorphous particulate silicon dioxide.

Preferably, the proportion of the amorphous particulate silicon dioxide (D4a) is 3% to 30%, based on the total mass of the refractories (D4).

In a preferred variant, constituent (D3) is formed by sheet silicates, e.g. pyrophyllite and/or powdered clay, and constituent (D4) is formed by microcrystalline graphite and zirconium silicate (in a mass ratio of 2:3 to 3:2). The proportion of the refractories (D3) here is preferably 40% to 60%, based on the total mass of refractories (D3) and refractories (D4). Preferably, constituent (D4) additionally contains (D4a) amorphous particulate silicon dioxide.

A core of the invention is producible by the method of the invention as described above.

A further aspect of the invention relates to the use of a core of the invention corresponding to the above-described third aspect of the invention, or of a core produced by a method of the invention corresponding to the above-described second aspect of the invention, in diecasting.

A method of using a core in diecasting, especially in the diecasting of lightweight metals, comprises the steps of producing a core by a method of the invention corresponding to the above-described second aspect of the invention, or providing a core of the invention corresponding to the above-described third aspect of the invention or a core produced by a method of the invention corresponding to the above-described second aspect of the invention,
  inserting the core into a casting mold,
  producing a casting by pouring a metal melt under a pressure of up to 200 MPa, preferably 10 MPa to 200 MPa, into the casting mold and allowing the metal melt to solidify, removing the core from the casting.

It has been found that, surprisingly, when cores of the invention are used in diecasting, in spite of the high pressure of the metal melt, penetration of the core surface by the metal melt is largely prevented. This is achieved by the refractory coating of the core of the invention. Moreover, the cores were found to be stable under the compressive stress that rises very quickly in the diecasting operation.

Cores of the invention corresponding to the above-described third aspect of the invention, or cores produced by a method of the invention corresponding to the above-described second aspect of the invention, are particularly suitable for use in the diecasting of lightweight metals, especially from the group consisting of aluminum and aluminum alloys. After cooling and solidification of the casting, for example by quenching of the casting in a water bath, the core can be removed from the casting by customary techniques, for example by gradual dissolution of the binder in water, or by hydrostatic pressure (for example by means of water jetting), or by means of vibration, acoustic decoring, or electrical pulse decoring.

In the case of use of cores of the invention corresponding to the above-described third aspect of the invention, or cores produced by a method of the invention corresponding to the above-described second aspect of the invention, the diecasting is preferably performed with the following machine parameters:

piston speed in the range from 1.00 m/s to 10.00 m/s, preferably 1.00 m/s to 5.00 m/s, more preferably 2.00 m/s to 2.10 m/s;

gate speed in the range from 5.0 m/s to 50.0 m/s, preferably 5.0 m/s to 40.0 m/s, further preferably 10 m/s to 20 m/s, more preferably 13 m/s to 19 m/s;

hold pressure in the range from 15 MPa to 100 MPa, preferably 35 MPa to 80 MPa, more preferably 60 MPa to 70 MPa.

A further aspect of the invention relates to the use of a composition (D) as described above in the context of the first aspect of the invention for production of a core of the invention corresponding to the above-described third aspect of the invention or in a method of the invention corresponding to the above-described second aspect of the invention.

With regard to preferred features of the composition (D), of the method of the invention and of the core of the invention, the above remarks are applicable.

The invention is elucidated in detail hereinafter with reference to working examples and comparative examples.

WORKING EXAMPLES

1. Production of Cores

Components (A)-(D) of a kit of the invention were provided for production of cores for use in diecasting. The composition of components (A)-(D) is described below. For the production of comparative cores, the same components (A)-(C) were provided, as was a noninventive coating composition, the composition of which is specified below.

Step (a): Production of a Molding Material Mixture

A molding material mixture was produced by mixing
(A) H32 quartz sand as mold base material with
(B) particulate amorphous silicon dioxide (0.3% to 1.5%, based on the total mass of the mold base material (A)), and
(C) a solution of waterglass (alkali metal silicate) containing lithium, sodium and potassium ions (0.3% to 3% solution (C), based on the total mass of the mold base material)

Steps (b) and (c): Production of the Main Bodies for Cores

This molding material mixture was used, in a customary manner, by
(b) shaping the molding material mixture by means of a core shooting machine and
(c) thermally curing the shaped molding material mixture in the core box heated to a temperature in the range from 100° C. to 250° C., assisted by aeration with air heated to a temperature in the range from 100° C. to 250° C.,
to form the main bodies for the cores to be produced.

Step d): Application of the Coating Composition

A coating composition was applied to the main bodies that had been cooled down to a temperature of less than 80° C., preferably 15° C. to 35° C.

Cores of the invention were produced using coating compositions (refractory coating) that were formed by diluting the concentrates (D) (see tables 1 and 2 below) with water as carrier liquid (D1). The coating composition was applied in each case to the surface of the main body by dipping the main bodies into a bath containing the respective coating composition. Comparative cores were produced using a coating composition that was formed by diluting the concentrate (V) (see table 1 below) with isopropanol as carrier liquid. The noninventive coating composition corresponds to customary commercially available refractory coating compositions. Refractory coatings customarily used in the prior art for waterglass-bound cores are those wherein the carrier liquid contains alcohols as main constituent, and little or no water, since water attacks the alkali metal silicate skeleton of waterglass-bound cores.

The viscosities of the inventive and noninventive coating composition are virtually identical. "Other constituents" (see table 1) are constituents that are customary in the prior art from the group consisting of wetting agents, rheological additives, binders, suspension aids and biocides.

Subsequently, the cores of the invention obtained in this way were subjected to a temperature in the range from 80° C. to 220° C., and the comparative cores to a temperature in the range from 15° C. to 30° C., such that the carrier liquid evaporates, and a coating of the nonvolatile constituents of the respective coating composition is formed on the main body.

TABLE 1

Composition of the coating compositions

| Constituent | Concentrate (D) for inventive coating composition 1 | | Concentrate (V) for noninventive coating composition V | |
|---|---|---|---|---|
| | | % by wt. | | % by wt. |
| Carrier liquid (D1) | Water | 38.5 | Isopropanol | 34 |
| | | | Water | 4 |
| Constituent (D2) | Acid (D2a) | 0.5 | — | 0 |
| Refractories (D3) | Sheet silicates (pyrophyllites, powdered clay) | 31 | — | 0 |
| Refractories (D4) | Zirconium silicate | 8 | Zirconium silicate | 40 |
| | Microcrystalline graphite | 8 | Aluminum oxide | 14.5 |
| | Particulate amorphous silicon dioxide (D4a) | 10 | | |
| Other constituents | | 4 | | 7.5 |
| | Inventive coating composition | | Noninventive coating composition | |
| Concentrate | 100 parts by weight concentrate (D) | | 100 parts by weight concentrate (V) | |
| Dilution by carrier liquid | 40 parts by weight of water | | 5 parts by weight of isopropanol | |

TABLE 2

Composition of further coating compositions for the production of cores of the invention Concentrate (D) for inventive coating composition No.

| Constituent | 2 | | 3 | | 4 | | 5 | |
|---|---|---|---|---|---|---|---|---|
| | | % by wt. | | % by wt. | | % by wt. | | % by wt. |
| Carrier liquid (D1) | Water | 49.5 | Water | 49.5 | Water | 44.5 | Water | 36 |
| Constituent (D2) | Acid (D2a) | 0.5 | Acid (D2a) | 0.5 | Acid (D2a) | 0.5 | Acid (D2a) | 0.5 |
| Refractories (D3) | Sheet silicates (mica, powdered clay) | 26 | Sheet silicates (pyrophyllites, mica, powdered clay) | 26 | Sheet silicates (pyrophyllites, mica, powdered clay) | 23 | Sheet silicates (mica, powdered clay) | 31 |
| Refractories (D4) | Microcrystalline graphite | 12 | Microcrystalline graphite | 12 | Microcrystalline graphite | 8 | Microcrystalline graphite | 8 |
| | | | | | Zirconium silicate | 10 | Zirconium silicate | 9 |
| | Particulate amorphous silicon dioxide (D4a) | 8 | Particulate amorphous silicon dioxide (D4a) | 8 | Particulate amorphous silicon dioxide (D4a) | 10 | Particulate amorphous silicon dioxide (D4a) | 8 |
| Other constituents | | 4 | | 4 | | 4 | | 7.5 |
| Concentrate | 100 parts by weight concentrate (D) | | 100 parts by weight concentrate (D) | | 100 parts by weight concentrate (D) | | 100 parts by weight concentrate (D) | |
| Dilution by carrier liquid | 40 parts by weight of water | | 25 parts by weight of water | | 40 parts by weight of water | | 40 parts by weight of water | |

2. Light Microscopy Analysis

Pieces were sawn out of an inventive core (production and composition as described in point 1, coating composition as specified in table 1 above) and a noninventive core (production and composition as described in point 1, coating composition as specified in table 1 above) and embedded by means of a two-component epoxy resin under reduced pressure. This was followed by preparation by means of a Struers Tegramin 20 grinding and polishing machine. This involved first grinding the samples by means of diamond disks and subsequently polishing with diamond suspensions until the final stage, resulting in what is called a polished section. Thereafter, the polished sections produced were microscopically examined by means of a Zeiss Axioscope 5 light microscope with Axiocam 305 color (D) microscopy camera.

On comparison of the dried cores (inventive vs. noninventive), a distinct difference in surface characteristics was apparent. In the case of noninventive cores, the refractory coating has penetrated very deep into the main body and has barely any surface-sealing action, such that the mold base material (A) is clearly apparent through the coating by the naked eye. Inventive cores, by contrast, feature a smooth surface seal, meaning that a coherent top layer virtually free of macroscopic pores has been deposited above the main body such that it is not apparent which mold base material (A) is present beneath the coating.

Figure 1:
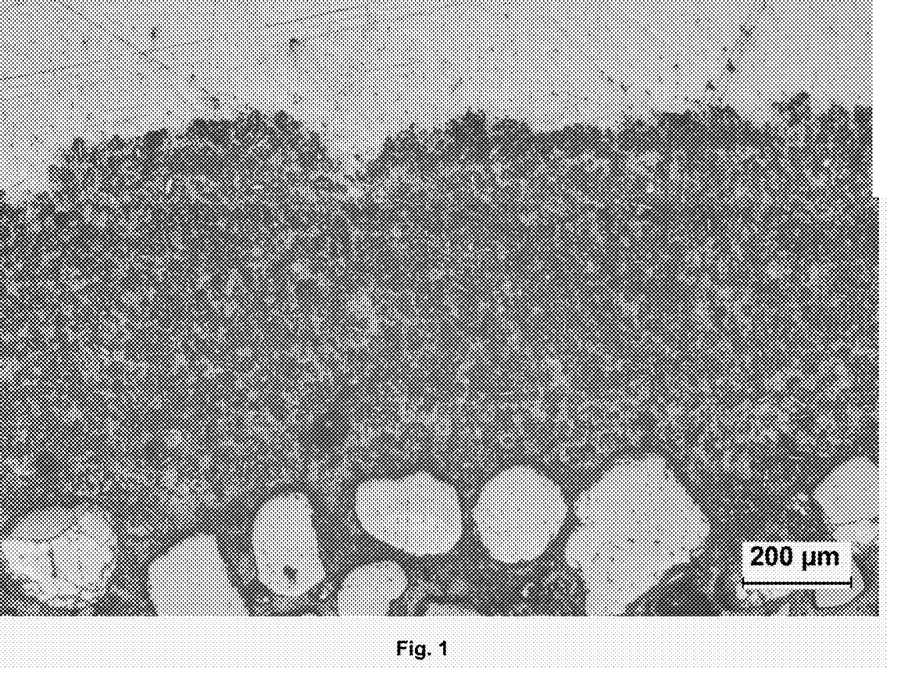
FIG. 1 shows a polished section of the noninventive core.
Figure 2:
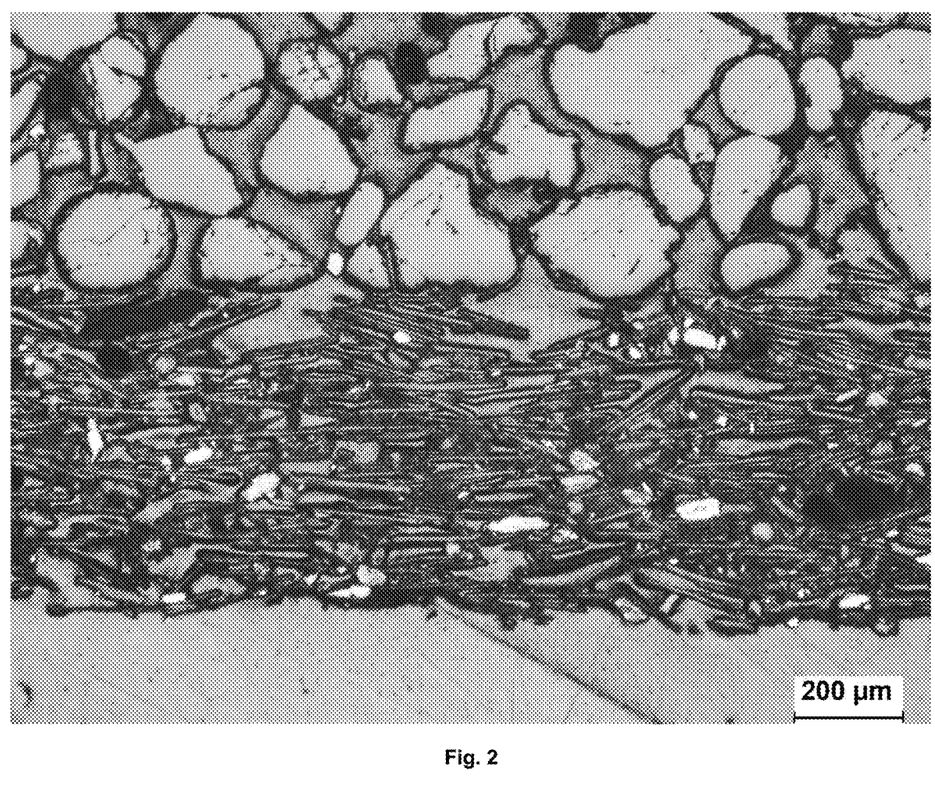
FIG. 2 shows a polished section of the inventive core.

FIG. 1 shows a polished section of the noninventive core; FIG. 2 shows a polished section of the inventive core. The section in each case extends over a near-surface region of the main body and the coating disposed on the surface thereof. In the main body, the relatively large particles of the mold base material (H32 quartz sand, see above) are clearly apparent (at the lower edge of the image in FIG. 1, at the upper edge of the image in FIG. 2). The coating adjoins the surfaces of the outer particles of the main body.

FIG. 1 shows that the grainy particles of the noninventive coating composition have been deposited entirely randomly, i.e. without any particular alignment, on the surface of the core. Although the grainy particles penetrate into pores between the particles of the mold base material, these are not covered and sealed. Therefore, the surface formed by the coating is not smooth and flat, but at least partly reproduces the contours of the surface of the main body, meaning that the coating has unevenness and depressions that to a certain degree reflect the irregularities of the surface of the main body.

FIG. 2 shows that the platelet-shaped particles of the coating composition of the invention are aligned with their longest dimension parallel to the core surface, and hence bridge and cover the unevenness and depressions filled by the grainy particles on the surface of the main body, such that the irregularities of the surface of the main body barely affect the surface of the coating. Therefore, the coating has a relatively flat and smooth surface.

3. Casting Tests

Casting tests with aluminum were conducted in a cold-chamber diecasting machine. It was possible here with cores of the invention to successfully produce castings with a gate speed of 15 m/s to 20 m/s without penetration defects (penetration of the melt into the core) or core fracture. In the case of casting with noninventive cores under the same conditions, by contrast, penetration defects were always found. After casting, the cast parts are quenched in a water bath. The core can be leached out of the casting, for example, by gradual dissolution of the alkali metal silicate binder in water or removed by means of water jetting.

We claim:

1. A method of producing cores for use in diecasting, comprising the steps of (a) producing a molding material mixture by mixing components (A), (B) and (C)

(b) shaping the molding material mixture (c) thermally curing the shaped molding material mixture to form a main body of [the] a core to be produced
(d) applying
a composition (D)
or a coating composition formed by diluting a composition (D) with carrier liquid (D1)
to the main body and then drying, such that a coating is produced on the main body, forming a core comprising the main body and a coating disposed atop the main body, which extends at least over an entire surface of the core that comes into contact with a metal melt in the casting operation,
wherein components (A), (B), and (C), and composition (D) are defined as follows:
A) a mold base material selected from the group consisting of quartz sand, chromium ore sand, olivine sand, aluminum silicate sands and mixtures thereof;
(B) particulate amorphous silicon dioxide or an additive mixture comprising particulate amorphous silicon dioxide;
(C) a solution or dispersion comprising waterglass or a kit comprising raw materials for production of a solution or dispersion comprising waterglass;
(D) a composition for production of a coating, said composition comprising
(D1) a carrier liquid selected from the group consisting of water and mixtures of water with one or more alcohols;
(D2) a constituent from the group consisting of
(D2a) dissolved in the carrier liquid, one or more acids, where the aqueous phase formed by the carrier liquid with the acids dissolved therein has a pH of 5 or less,
(D2b) one or more organic compounds of the formula (I)

(I)

where R1 and R2
are each monovalent groups independently containing 1 to 26 carbon atoms, where the R1 group is attached via a carbon atom present in the R1 group or via an oxygen atom present in the R1 group, and where the R2 group is attached via a carbon atom present in the R2 group,
or
are joined to one another to form a ring structure, such that the ring structure comprises a total of 4 to 7 ring atoms and the R1 and R2 groups comprise a total of 2 to 26 carbon atoms, where the R1 group is attached via a carbon atom present in R1 group or via an oxygen atom present in the R1 group, and where R2 group is attached via a carbon atom present in the R2 group;
(D3) one or more refractories in the form of particles
(D4) one or more refractories in the form of grainy particles wherein the proportion of the one or more refractories (D3) is in the range from 15% to 80%, based on the total mass of one or more refractories (D3) and one or more refractories (D4) in component (D).

2. The method as claimed in claim 1, wherein, in step (c), the thermal curing is effected at temperatures in the range from 100° C. to 300° C.

3. The method as claimed in claim 1, wherein, in step (d), the main body on application of the composition (D) or of the coating composition is at a temperature of less than 80° C.;
and/or
the composition (D) or coating composition is applied to the surface of the main body by a method selected from the group consisting of spraying, dipping, flow coating and painting, preferably dipping;
and/or
the drying is effected at temperatures in the range from 80° C. to 220° C.

4. The method as claimed in claim 1, wherein, in step (d), the composition (D) or coating composition is applied to the surface of the main body by dipping.

5. The method as claimed in claim 1, wherein the particles of (D3) have three dimensions, the three dimensions comprising a length, a width, and a thickness that extend at right angles to one another, where the length is the greatest dimension, the thickness the smallest dimension, and a ratio of thickness/length is 0.2 or less.

* * * * *

UNITED STATES PATENT AND TRADEMARK OFFICE
CERTIFICATE OF CORRECTION

PATENT NO. : 12,145,193 B2
APPLICATION NO. : 17/778271
DATED : November 19, 2024
INVENTOR(S) : Sabrina Maria Sachau et al.

It is certified that error appears in the above-identified patent and that said Letters Patent is hereby corrected as shown below:

On the Title Page

Under (73) Assignee: reads "HUTTENES-ALBERTUS Chemische Werke Gesellschaft mit beschränkter haftung, Düsseldorf (DE)" but should read -- HUTTENES-ALBERTUS Chemische Werke Gesellschaft mit beschränkter Haftung, Düsseldorf (DE) --

In the Claims

In Column 28, Line 32 of Claim 3 reads "and painting, preferably dipping;" but should read -- and painting; --

Signed and Sealed this
Eighth Day of July, 2025

Coke Morgan Stewart
*Acting Director of the United States Patent and Trademark Office*